Patented Sept. 9, 1952

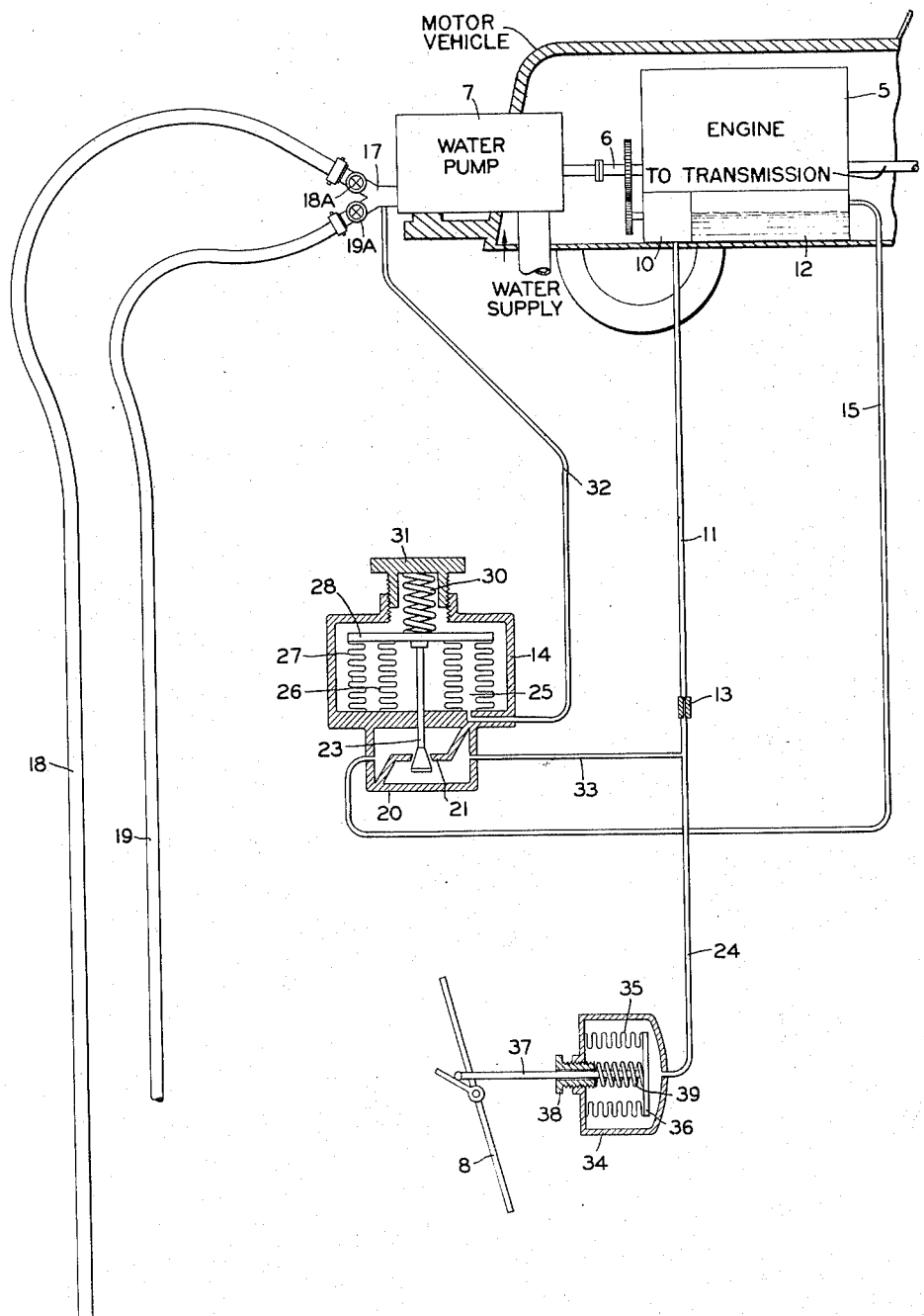

2,609,755

UNITED STATES PATENT OFFICE 2,609,755

CONTROL SYSTEM FOR AN AUTOMOTIVE TYPE OF PUMPER

Augustus W. Griswold, Rochester, N. Y., assignor to Taylor Instrument Companies, Rochester, N. Y., a corporation of New York Application January 10, 1948, Serial No. 1,627

5 Claims. (Cl. 103—17)

This invention relates to a control system and more particularly to a system for controlling the pressure of water delivered for fire fighting purposes by an automotive type of pumper.

In the operation of such a pumper it is specially important that the pressure of the water delivered thereby, shall remain substantially uniform, since if the water pressure suddenly changes in a connected hose held by a fireman on a ladder, the hose may throw the fireman from the ladder. The difficulty in maintaining such a uniform pressure is occasioned by the fact that one or more hoses may be connected to or disconnected from the outlet of the pumper so that the changing demand or load, presents an especially difficult problem of maintaining a uniform water pressure.

In accordance with the present invention there is provided a system whereby the output water pressure of such a pumper is maintained uniform within very close limits even under large changes in load.

The various features and advantages of the invention will appear from the detailed description and claims when taken with the drawing in which the invention is diagrammatically illustrated.

While the invention relates to the combination of a pressure control system with an automotive type of pumper for fire fighting purposes, it is necessary only to refer to the gasoline motor 5 together with the carbureter and the pressurized lubricating oil circuit for the pumper. This motor operating through a suitable shaft 6 drives an oil pump 10 for pressurizing the oil in the lubricating circuit to the motor and also drives a high pressure water pump 7 of any suitable type. The speed of the motor 5 and therefore the speed of the water pump 7 driven thereby, is controlled by the butterfly valve 8 of a carbureter. This carbureter may be one that is operated by the accelerator pedal (not shown) when the pumper is being driven to a fire. Only one such carbureter is illustrated but it will be understood that if plural carbureters are used, they will be connected to the motor in the same manner as the carbureter illustrated. The oil pump 10 circulates oil to the motor and also serves to deliver oil at high pressure to the output pipe 11, this oil being pumped from a sump tank 12 wherein the oil is at reduced or atmospheric pressure. The oil in the output pipe 11 of the pump passes through a restriction 13, pipe 33 and through control unit 14 to pipe 15 and thence to the tank 12.

The discharge pipe of the water pump communicates with a coupling 17 to which one or more hose lines 18 and 19 can be coupled. The coupling is provided with hand or other cut-off valves 18a and 19a for the respective hose lines. It will be understood that when one of these hose lines is thus cut-off the water pressure in the remaining hose line such as 18 will tend to increase suddenly whereas if an additional hose line 19 is added such as by opening the valve 19a the pressure in both lines would tend to drop abruptly. Such sudden increases or decreases in the water pressure in the hose lines is highly undesirable.

Therefore, in accordance with the present invention, a control system is combined with the motor and the oil pump thereof which system includes the mentioned control unit 14. This unit comprises a valve body 20 which is provided with a valve seat 21. A movable valve element 23 cooperates with the valve seat 21 and thereby determines the flow of oil through pipe 15 and also determines the back pressure of the oil in the pipes 33 and 24. Within the valve body 20 there is provided an expansible chamber 25 preferably formed by the concentrically mounted bellows which have their lower ends sealed to a fixed part of the valve body. The upper ends of these bellows are sealed to a circular plate 28, to the undersurface of which the movable valve element 23 is secured. A coil spring 30 having one end engaging the upper surface of the plate 28 and having its upper end engaging the interior of the screw cap 31 provides an adjustable bias on the circular plate 28. The interior of the chamber 25 communicates through a pipe 32 with the output of the water pump 7. Thus any change in the water pressure in the pipe 32 is communicated to the chamber 25. For example, if the water pressure in the pipe 32 and consequently in the chamber 25 tends to increase, this chamber will operate the movable element 23 in a direction tending to engage the valve seat 21. This will cause the oil pressure in the pipe 33 and the branch pipe 24 to increase. The pipe 24 communicates with the pressure responsive unit 34 which adjusts the butterfly valve 8 of the carbureter tending to slow down the motor 5 and therefore the water pump 7. This substantially corrects the deviation in the water pressure. If, however, the pressure in water pipe 32 and chamber 25 tends to drop, the mentioned parts will operate in the reverse sense tending to speed up the motor 5 and the water pump 7 until the water pressure deviation is substantially corrected.

The unit 34 preferably comprises a bellows 35 having its left end sealed to the rigid cup of the pressure responsive unit and having its other end sealed to a circular plate 36. This plate is provided with a rod 37 which operates to adjust the butterfly valve 8 of the carbureter so that more or less fuel is supplied to the motor 5 as required to control the speed of the motor and the water pump driven thereby.

It should be pointed out that the present arrangement automatically corrects for changes in oil pressure. Let it be assumed that the system is completely balanced, and then that there is a change in the pressure of the oil from the pump 10 due either to an increase in the viscosity of the oil or due to the increase in the speed of the oil pump. The oil pressure in pipe 33 will increase and likewise in the branch pipe 24, which forces the bellows motor 34 toward the left to slow down the motor 5 and consequently the speed of the water pump 7. As a result of this, the output pressure of the water pump will tend to decrease. This drop in water pressure is communicated through pipe 32 to the chamber 25 which will tend to contract and thereby open the valve element 23 slightly. This tends to lower the oil pressure in the pipe 33 and in branch pipe 24, as well as in the pressure responsive unit or bellows motor 34. As a consequence, the bellows motor 35 tends to move to the right. This will adjust the butterfly valve 8 of the carbureter until the speed of motor 5 is adjusted approximately to its original value so that the output pressure of the water is also restored approximately to its original value. While there is a slight change in the output pressure of the discharged water, this change is within the tolerable limits of operation. A decrease in the viscosity of the oil or a decrease in the oil pump speed will act in a similar manner but in the reverse sense.

What I claim is:

1. In combination, a motor vehicle, comprising a fuel combustion motor for propelling said vehicle, an adjustable carbureter for supplying fuel to said motor whereby the speed thereof can be controlled, a source of lubricating oil, and an oil pump individual to and driven by said motor for supplying lubricating oil under pressure from said source to said motor, a water pump on said vehicle also operated by said motor and serving to discharge water under pressure, a valve means on said vehicle loaded by the pressure of the discharged water from the water pump, mechanism for adjusting said carbureter, and piping means connecting said oil from said oil pump to said mechanism under control of said valve means at a pressure which is a function of the pressure of the discharged water.

2. In combination, a motor vehicle, comprising a fuel combustion motor for propelling said vehicle, an adjustable mechanism for controlling the supply of fuel to said motor whereby the speed thereof can be controlled, a source of lubricating oil, and an oil pump individual to and driven by said motor for supplying lubricating oil under pressure from said source to said motor, a water pump on said vehicle also operated by said motor and serving to discharge water under pressure, a unit on said vehicle loaded by the pressure of the discharged water, an oil operated device for adjusting said mechanism, and means connecting the output of the oil pump to said device under the control of said unit for applying oil to said device at a pressure which is a function of the pressure of the discharged water.

3. The combination with a motor vehicle, comprising a fuel combustion motor for propelling said vehicle, an adjustable mechanism for supplying fuel to said motor in amounts whereby the speed thereof can be controlled, a source of lubricating oil, and an oil pump individual to and driven by said motor for supplying lubricating oil under pressure to said motor from said source, of a water pump on said vehicle operated by said motor and serving to discharge water under pressure, a controller on said vehicle connected to said water pump and responsive to the pressure of the water discharged therefrom, a device for adjusting said mechanism, and conduit means governed by said controller for applying oil to said device at a pressure which bears a proportional relation to the pressure of the discharged water.

4. In combination, a motor vehicle, comprising a fuel combustion motor for propelling said vehicle, an adjustable mechanism for supplying fuel to said motor in amounts whereby the speed thereof can be controlled, a source of lubricating oil on said vehicle, and an oil pump individual to and driven by said motor for supplying lubricating oil under pressure to said motor from said source, a water pump on said vehicle operated by said motor and serving to discharge water under pressure, a fluid operated valve on said vehicle comprising a valve body, a movable valve element cooperating therewith and an expansible chamber for operating said element, said chamber being responsive to changes in the pressure of the discharged water, an oil operated device connected to said mechanism for adjusting the same, an output pipe to which oil under pressure is delivered by said oil pump, said fluid operated valve being connected in said output pipe whereby the movable valve element thereof controls the pressure of the oil in said output pipe, a restriction in said output pipe, and a branch pipe communicating with said device and with said output pipe at a point therein between said restriction and said valve.

5. The combination with a motor vehicle comprising a fuel combustion motor for propelling the vehicle, an adjustable device for supplying fuel to said motor in amounts whereby the speed thereof can be controlled, a source of oil on said vehicle, and an oil pump individual to and driven by said motor for supplying lubricating oil under pressure to said motor from said source, of a water pump operated by said motor and serving to discharge water under pressure, a unit on said vehicle operated by the pressure of the discharged water, mechanism for adjusting said device, and means including said unit for applying oil to said mechanism at a pressure which is a function of the pressure of the discharged water.

AUGUSTUS W. GRISWOLD.

REFERENCES CITED

The following references are of record in the file of this patent:

UNITED STATES PATENTS

| Number | Name | Date |
| --- | --- | --- |
| 459,384 | Heermans | Sept. 8, 1891 |
| 1,006,803 | Stevens | Oct. 24, 1911 |
| 1,112,394 | Sprado | Sept. 29, 1914 |
| 2,137,219 | Aikman | Nov. 22, 1938 |
| 2,223,592 | Barton | Dec. 3, 1940 |
| 2,255,095 | Baker | Sept. 9, 1941 |
| 2,274,763 | Yates | Mar. 3, 1942 |

FOREIGN PATENTS

| Number | Country | Date |
| --- | --- | --- |
| 372,196 | Germany | 1923 |